United States Patent [19]

Kakubo

[11] Patent Number: 5,185,680
[45] Date of Patent: Feb. 9, 1993

[54] METHOD FOR SYNCHRONIZING RECORDING AND REPRODUCING DEVICES

[75] Inventor: Yuji Kakubo, Hamamatsu, Japan

[73] Assignee: Yamaha Corporation, Hamamatsu, Japan

[21] Appl. No.: 589,985

[22] Filed: Sep. 28, 1990

[30] Foreign Application Priority Data

Oct. 3, 1989 [JP] Japan .................. 1-258138

[51] Int. Cl.$^5$ .................. G11B 15/52; G11B 27/22; G11B 27/28
[52] U.S. Cl. .................. 360/72.2; 360/27; 360/73.11
[58] Field of Search .................. 360/72.2, 27, 26, 51, 360/18, 73.09, 73.11, 73.12, 73.13, 73.14, 73.01, 73.02, 73.04, 15

[56] References Cited

U.S. PATENT DOCUMENTS

| | | | |
|---|---|---|---|
| 3,441,342 | 4/1969 | Ball et al. | 360/73.02 |
| 4,381,525 | 4/1983 | Senoo et al. | 360/51 |
| 4,586,093 | 4/1986 | Fukuju et al. | 360/73.02 |
| 4,675,757 | 6/1987 | Block | 360/73.13 |
| 4,772,966 | 9/1988 | Sharples et al. | 360/73.04 |
| 4,864,431 | 9/1989 | Murase | 360/15 |
| 4,907,105 | 3/1990 | Kurzweil, Jr. | 360/73.02 |

Primary Examiner—Stuart S. Levy
Assistant Examiner—Craig A. Renner
Attorney, Agent, or Firm—Spensley Horn Jubas & Lubitz

[57] ABSTRACT

In a method for synchronizing recording and reproducing devices including a master device and a slave device, during a recording mode and in a state where reference clock of the slave device is synchronized with reference clock of the master device, position information which is synchronized with the reference clock of the master device is recorded commonly in both the master and slave devices and information to be recorded is simultaneously recorded in both the master and slave devices. During a playback mode, the master device and the slave device reproduce the position information respectively at their own reference clocks and cause internal counters provided in the respective devices to perform counting at their own reference clocks and to be reset at a predetermined period of the position information reproduced in the respective devices. The slave device compares a reproduced value of the position information and a count value of the internal counter provided by the master device with a reproduced value of the position information and a count of the internal counter of the slave device and thereby causes the reference clock frequency of the slave device to change so that differences between the values of the master device and those of the slave device become predetermined values.

2 Claims, 5 Drawing Sheets

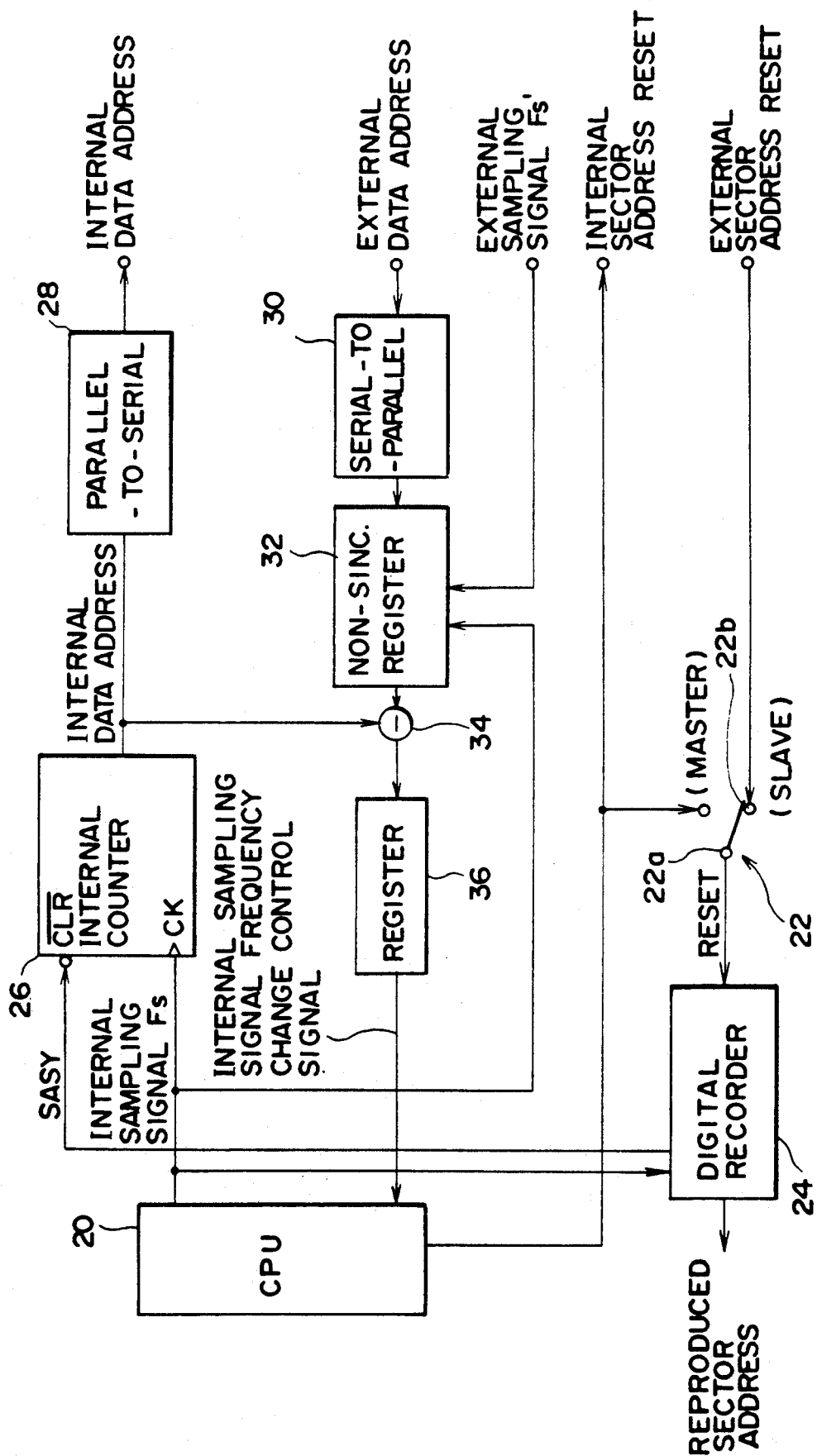
F I G. 1

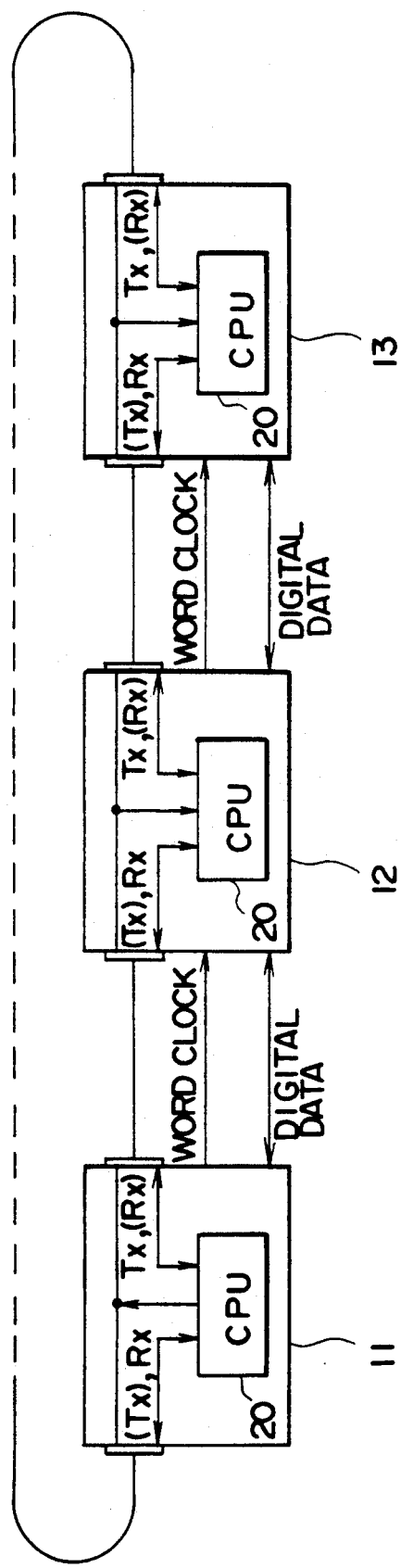
F I G. 3
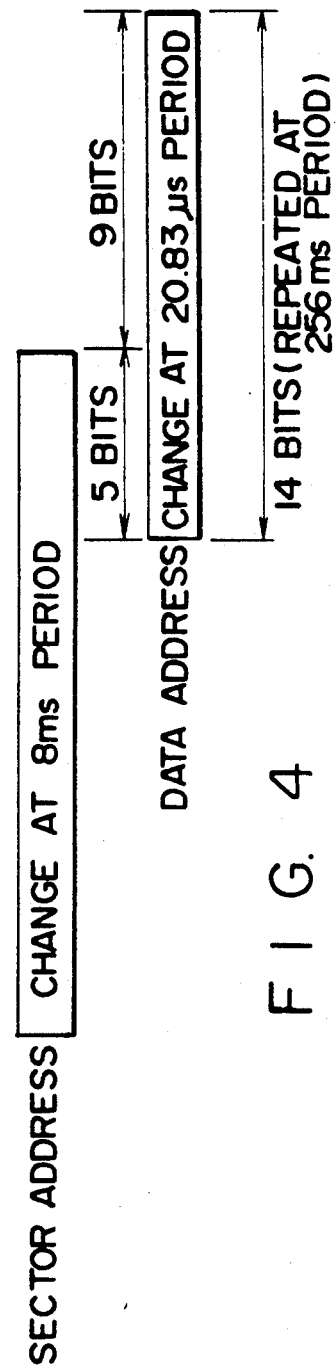
F I G. 4

METHOD FOR SYNCHRONIZING RECORDING AND REPRODUCING DEVICES

BACKGROUND OF THE INVENTION

This invention relates to a method for synchronizing plural recording and reproducing devices and, more particularly, to a method for synchronizing these devices with an improved accuracy.

In a case where, in performing multi-recording by employing a multi-track tape recorder, the number of channels in which recording must be made is larger than the number of tracks of a single multi-track tape recorder, multi-recording is achieved by synchronizing plural multi-track tape recorders. In this case, according to a conventional method, synchronization among respective tape recorders is made for performing operations such as mix down in such a manner that position information such as time code or sector address is recorded commonly in respective tape recorders during a recording mode and, during a playback mode, reproduced position is controlled so that reproduced position information in the respective tape recorders coincide with each other.

Since time code has an accuracy of only several hundred microseconds and sector address has an accuracy of only several milliseconds, accuracy in synchronization exceeding these values (e.g., accuracy of a sampling word) cannot be achieved even if reproduced position information of plural tape recorders coincide with each other as shown in FIG. 2. It is therefore difficult to synchronize plural tape recorders with a high accuracy and thereby realize operations such as mix down with a high accuracy.

Moreover, according to the conventional method, in playing back plural tape recorders in synchronization, a synchronizer is separately provided or, in a case where one tape recorder is used as a master device and another tape recorder is used as a slave device, the slave device is controlled for synchronization by a synchronizer or the master device and, accordingly, a synchronizer must be provided or a control section must be provided in the master device. In any case, the conventional method requires a complex construction resulting in a high manufacturing cost.

SUMMARY OF THE INVENTION

It is an object of the invention to provide a method for synchronizing recording and reproducing devices in which plural recording and reproducing devices can be synchronously played back with a high accuracy in synchronization and, besides, simplification of the construction is realized by omission of a synchronizer or a control section in a master device for controlling a slave device.

The method for synchronizing recording and reproducing devices achieving the above described object of the invention including a master device and a slave device in which reference clock frequency of at least the slave device can be changed and playback speed of the slave device can be controlled in accordance with the reference clock frequency, the master device and slave devices having respectively an internal counter, comprises a recording step and a playback step, said recording step comprising the steps of recording position information, which is synchronized with the reference clock of the master device and has a larger period of change than the reference clock, commonly in both the master and slave devices, and recording, simultaneously with the position information recording step, information to be recorded in the master and slave devices, and said playback step comprising the steps of reproducing the position information respectively by the master device and the slave device at their own reference clocks, counting up the internal counters in the respective devices at their own reference clocks, resetting the internal counters at a predetermined period of the position information reproduced in the respective devices, comparing a reproduced value of the position information and a count value of the internal counter in the master device with a reproduced value of the position information and a count value of the internal counter of the slave device, and changing a frequency of the reference clock of the slave device so that difference between the values of the master device and those of the slave device become predetermined values, whereby the slave device can synchronize its recording and reproducing position with a recording and reproducing position of the master device.

According to the invention, during a recording mode, the master device and the slave device respectively record position information with their reference clocks in synchronization with each other whereas, during a playback mode, the master device and the slave device reproduce the position information independently from each other with their own reference clocks and cause their internal counters to perform counting with their own reference clocks and to be reset at a predetermined period of the position information. Difference in the values of the position information and difference in the count values of the internal counters between the master device and the slave device, therefore, correspond to difference in position of reproduced data between the master and slave devices. Accordingly, by changing the reference clock frequency of the slave device during the playback mode and thereby changing the playback speed of the slave device to bring the differences to predetermined values, a synchronized playback with a high accuracy can be achieved on the basis of the reference clocks. Besides, according to the method of the invention, the count values of the internal counters are not recorded on a record medium such as a tape or a disk, so that the word length of position information recorded on the record medium can be a short one. Further, according to the invention, during the playback mode, when the master device has provided reproduced position information and a count value of its internal counter one-sidedly, the slave device changes its reference clock frequency to synchronize its playback position to the master device on the basis of the reference clock, so that it is not necessary to provide in the master device a control section for controlling the slave device with a result that the construction of the recording and reproducing devices as a whole can be simplified.

A preferred embodiment of the invention will be described below with reference to the accompanying drawings.

BRIEF DESCRIPTION OF THE DRAWINGS

In the accompanying drawings,

FIG. 1 is a block diagram showing an embodiment of the invention;

FIG. 3 is a block diagram showing an example of a system to which the method of the invention is applied;

FIG. 4 is a diagram showing relation between sector address and data address in the circuit of FIG. 1;

DESCRIPTION OF A PREFERRED EMBODIMENT

An embodiment of the invention will be described with reference to FIGS. 1, 3 and 4. In this embodiment, as shown in FIG. 3, the invention is applied to a system in which slave devices 12, 13 etc. are synchronized with a master device 11. Sector address recorded in a tape control track is used as reproduced position information. Alternatively, time code or other type of information may be used.

Prior to description of the preferred embodiment, explanation of the terminology used in this embodiment will be given.

Irrelevant to PCM signal data to be recorded on the tape, "time code" represents relative position on the tape by means of hour, minute, second and bit. It is recorded on a track for time code on the tape. Changing period of the time code is 417 microseconds.

"Sector address" consists of 384 PCM signal data and it is recorded on a control track of the tape. Its changing period is 8 milliseconds.

"Data address" will be given every PCM signal data, simply incremented within 32 sectors and reset when the 33rd sector comes. Changing period of the data address is 20.8 microseconds. The data address is not recorded on the tape.

Figure 2:
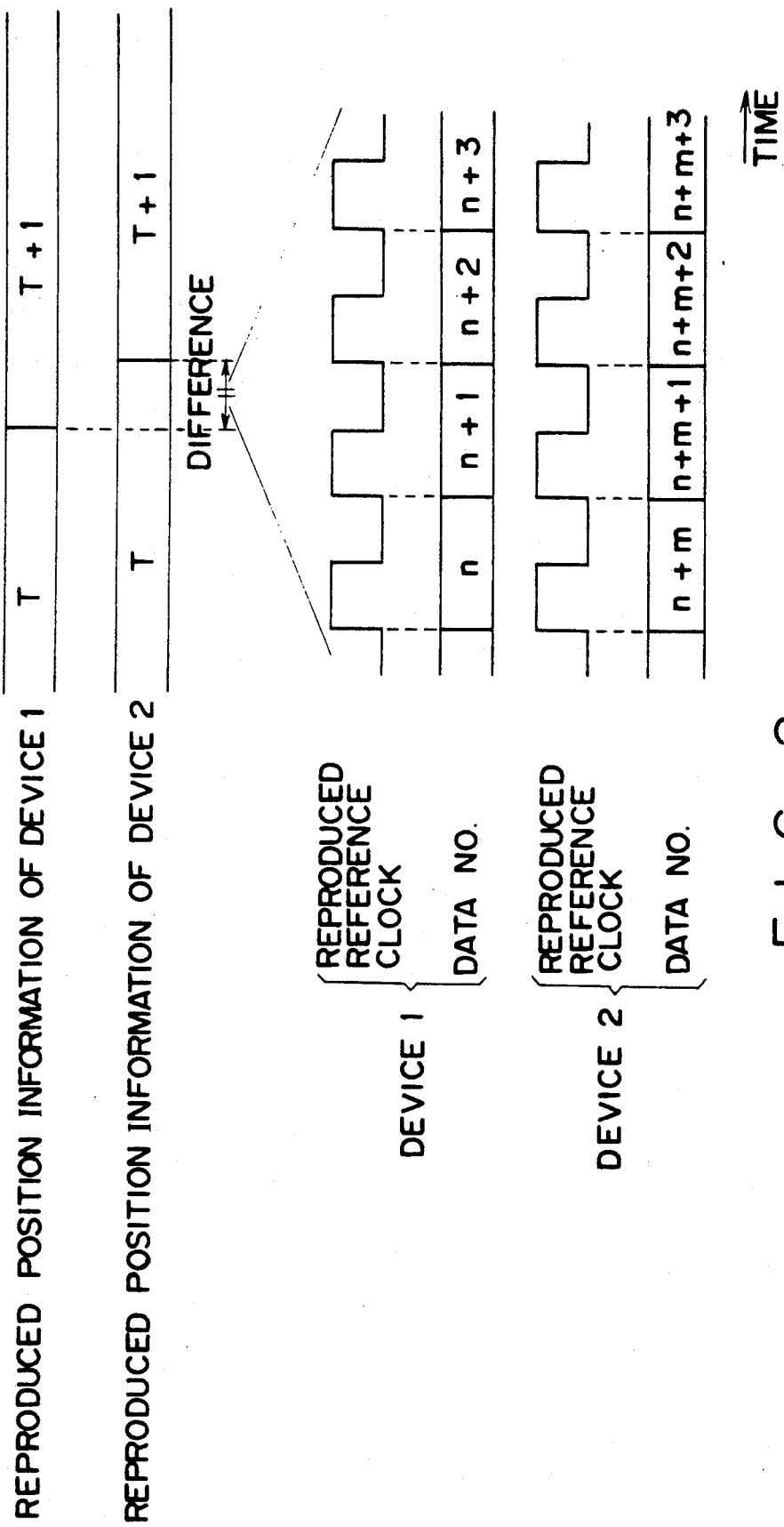
FIG. 2 is a time chart for describing the synchronized playback control in the prior art method.
Figure 5:
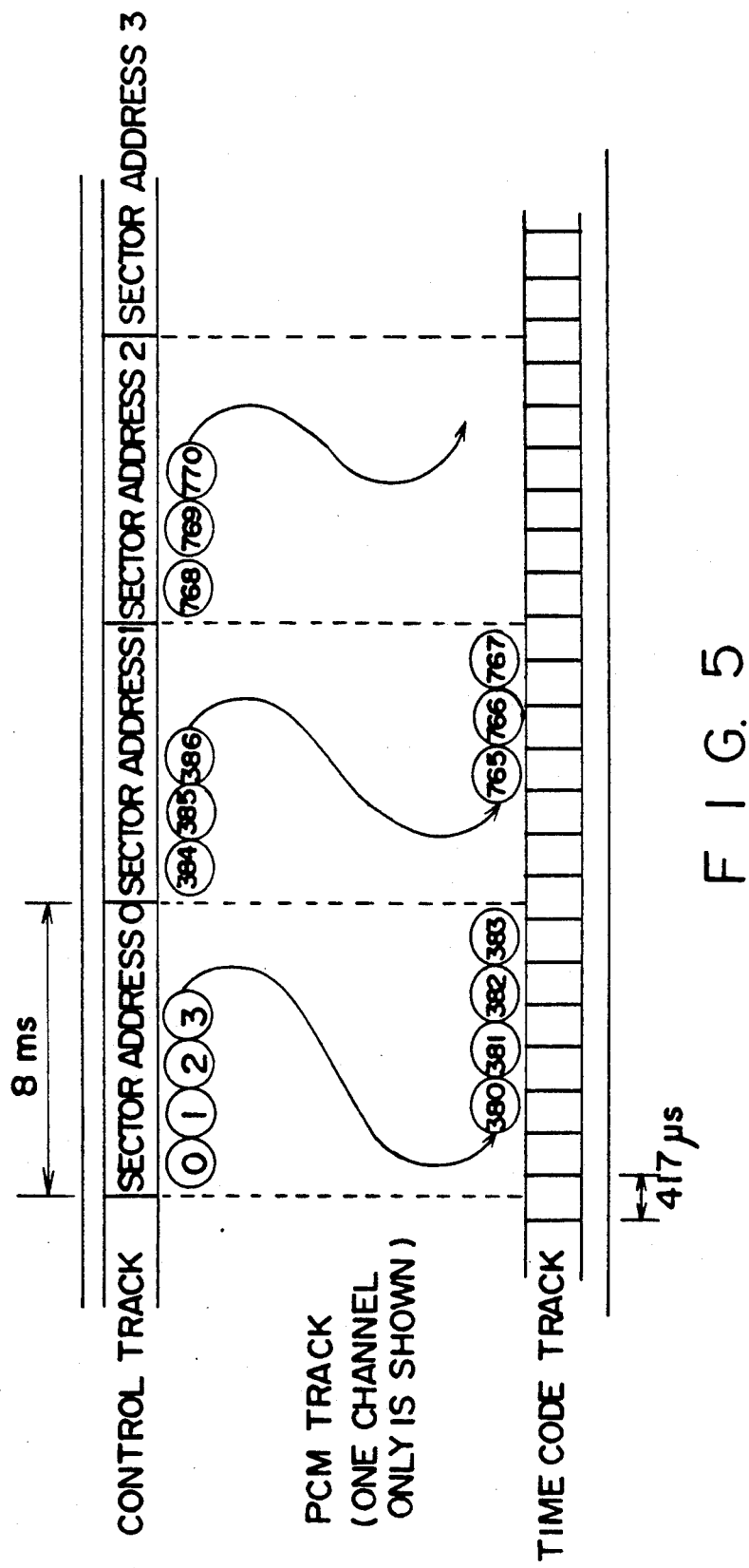
FIG. 5 is a graph showing configuration of data format of sector address etc.

Configuration of these data formats is illustrated in FIG. 5. In the figure, it is understood that a minimum unit of the time code track is asynchronous with a minimum unit of a sector address.

An address reset signal is produced by the master device 11 and transmitted to all of the slave devices 12, 13 etc. simultaneously. This is performed during a synchronized recording mode to initialize and synchronize sector address (address recorded in a control track of a tape) of the respective devices. The sector addresses of the respective devices 11, 12, 13, etc. thereby become the same.

Tx and Rx designate control signal lines between the master device 11 and the slave devices 11, 12 etc. and connecting CPUs (central processing units) of the respective devices 11, 12, 13 etc. with one another by means of a daisy chain. A synchronization control during recording of digital audio data is made by using a word clock from the master device 11 as a reference clock.

In a synchronized playback mode, the respective devices 11, 12, 13 etc. perform playback by using their own reference clocks and also generate finer position information than sector addresses in their internal counters on the basis of reproduced sector addresses. Reference clock frequencies of the slave devices 12, 13 etc. are changed to change the playback speed so that the sector addresses reproduced and count values of the internal counters of the slave devices 12, 13 etc. will coincide with those of the master device 11 whereby the playback position is controlled.

An example of a control circuit for controlling synchronized recording and reproduction in the respective devices 11, 12 and 13 is shown in FIG. 1. This control circuit can be used either for the master device 11 or the slave devices 12, 13 etc. In the case of using it for the master device 11, a switch 22 is connected to a contact 22a whereas in the case of using it for the slave devices 12, 13 etc., the switch 22 is connected to a contact 22b.

A CPU 20 produces an internal sampling signal Fs of a frequency which is, e.g., 48 kHz, 44.1 kHz or 32 kHz. Internal sampling frequency Fs of the slave devices 12, 13 etc. is synchronized with the internal sampling frequency Fs of the master device 11 during recording. During synchronized playback, the internal sampling frequency of the slave devices 12, 13 etc. is changed to change the playback speed.

A digital recorder 24 may be constructed as, e.g., a fixed head type digital audio tape recorder and digital data is recorded therein and reproduced therefrom at a sampling frequency of e.g., 48 kHz, 44.1 kHz or 32 kHz in response to the internal sampling frequency Fs. During recording, the digital recorder 24 generates sector address as reproduced position information by counting the internal sampling signal Fs and records this sector address on a control track of a record medium. The accuracy of the sector address is about 8 ms.

At the start of synchronized recording, an internal sector address reset signal is produced by the CPU 20 of the master device 11 and applied to the digital recorder 24 of the master device 11 through the contact 22a of the switch 22 to reset a sector address generation counter provided in the digital recorder 24. Simultaneously, the internal sector address reset signal of the master device 11 is supplied to the slave devices 12, 13 etc. as an external sector address reset signal. In the respective slave devices 12, 13 etc., this signal is applied to the digital recorder 24 through the contact 22b of the switch 22 to reset the sector address generation counter. In this manner, the sector addresses of the master device 11 and the slave devices 12, 13 etc. are simultaneously reset and counted up by the internal sampling signal Fs.

During the synchronized recording, the internal sampling signal Fs of the slave devices 12, 13 etc. is synchronized with the internal sampling signal Fs of the master device 11, so that the sector addresses of the respective devices 11, 12, 13 etc. are synchronized with one another. In this state, synchronized recording is made and a common sector address is recorded in the respective devices 11, 12, 13 etc.

During synchronized playback, sector addresses are reproduced with digital data signals from the digital recorders 24 of the respective devices 11, 12, 13 etc. The reproduced sector address of the master device 11 is transmitted to the slave devices 12, 13 etc. The slave devices 12, 13 etc. compare the reproduced sector addresses of their own with the reproduced sector address of the master device 11 and thereupon controls the playback position in a known manner so that these reproduced sector addresses of the slave device 12, 13 etc. coincide with the reproduced sector address of the master device 11. The playback position can thereby be synchronized with the sector address accuracy (about 8 ms).

During synchronized playback, a signal SASY is produced by the digital recorder 24 at each predetermined period of reproduced sector address (e.g., a repetition period of five bits of lower orders=about 256 ms). This signal SASY is applied to an internal counter 26 to reset it. The internal counter 26 is counted up with its internal sampling signal Fs and its count value is utilized as data address which is finer address information than the sector address. The master device 11 delivers out this internal data address through a parallel-to-serial converter 28. The slave devices 12, 13 etc. receive the internal data address transmitted from the master device 11 as external data address and supply it to a non-synchronization register 32 through a serial-to-parallel converter 30. The non-synchronization register 32 of the slave devices 12, 13 etc. receives the internal sampling signal Fs of the master device 11 as an external sampling signal Fs' and, utilizing this external sampling signal Fs' and the internal sampling frequency Fs of its own, converts the external data address data synchronized with the internal clock of the master device 11 to external data address data synchronized with the internal clock of its own.

Figure 6:
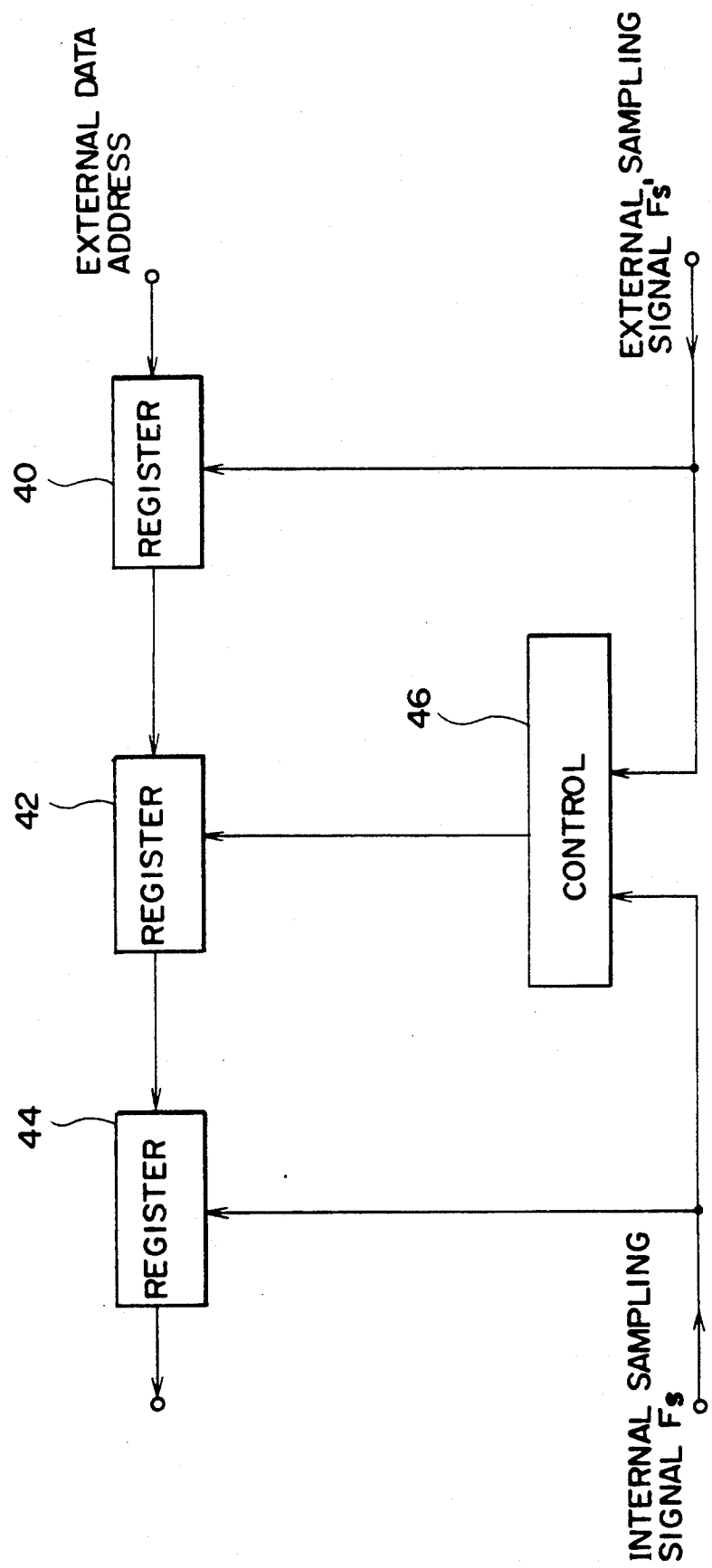
FIG. 6 is a block diagram showing a construction of the non-synchronization register 32.

In FIG. 6, a construction of the non-synchronization register 32 is given. It is described in detail in U.S. patent application Ser. No. 07/384,637 now U.S. Pat. No. 5,012,138. Explanation will be briefly given hereunder.

A register 40 fetches the external data address, which is synchronized with external sampling signal Fs', from the master device 11.

Data error happens in a long period if data transfer is performed between two apparatuses in which internal clocks are almost the same. To prevent this problem, if phase difference between the two apparatuses is within a predetermined range, the readout timing from a register 42 is forced to change 180 degrees.

The external data address is transferred to a register 44 from the register 42 in the above-mentioned manner, and the register 44 outputs the data synchronously with the internal sampling frequency Fs.

A subtractor 34 performs subtraction between the internal data address and the external data address and thereupon produces difference data between them. This difference data is held by a register 36. The register 36 is renewed each time new difference data is provided at a period of the SASY signal.

The CPU 20 of the slave devices 12, 13 etc. performs a control to change the frequency of the internal sampling signal Fs of the slave device so that the difference data held by the register 36 becomes 0 or a predetermined value close to 0 in view of delay time in the serial-to-parallel converter 30 (in other words, the data addresses coincide substantially with each other). The playback position thereby is synchronized on the basis of data address (i.e., on the basis of the sampling period).

Relation between the sector address and the data address is shown in FIG. 4. The sector address changes at a period of 8 ms and its address value continues to increase and there is no repetition. The data address changes at a period of the sampling period (i.e., 20.83 microseconds if the sampling frequency is 48 kHz) and is reset at the period of the signal SASY, i.e., 256 ms. Accordingly, there are 256 ms÷20.83 microseconds=12288 addresses in the data address. The data address is expressed as data of 14 bits. Since 5 bits of higher orders of the data address are common in orders with 5 bits of lower orders of the sector address, the address expressed by the remaining 9 bits of lower orders of the data address constitutes a fine address dividing the sector address in sections. If this address of 9 bits was added to the sector address and recorded in a control track of a tape, the word length of the recorded data would become an excessively large one and it would be difficult to adopt such large word length due to limitation in the recording density and other factors.

Since, according to the invention, the same address is generated as data address during playback and not recorded on the tape, adoption of such address can be realized without posing any difficulty.

The operation during synchronized recording and synchronized playback in the example in which the circuit of FIG. 1 is applied to the master device 11 and the slave devices 12, 13 etc. will now be described.

During synchronized recording, the switch 22 is connected to the contact 22a in the master device 11 and to the contact 22b in the slave devices 12, 13 etc. The slave devices 12, 13 etc. receive the internal sector address reset signal of the master device 11 as the external sector address reset signal and has the internal sampling frequency Fs of these slave devices 12, 13 etc. synchronized with the internal sampling frequency Fs of the master device 11.

Upon receipt of a command from the master device 11 to start synchronized recording in all of the devices 11, 12, 13 etc., the all devices 11, 12, 13 etc. are synchronously driven by the synchronized internal sampling frequency Fs and recording is started. Simultaneously, the internal sector address reset signal is provided from the CPU 20 of the master device 11 and the sector address generation counters of all devices 11, 12, 13 etc. are reset. Since the sector address generation counters are counted up with the synchronized internal sampling frequency Fs, a sector address which is common to all devices 11, 12, 13 etc. is recorded with data to be recorded in the respective devices 11, 12, 13 etc.

During synchronized playback, designation of goal of playback position is made by the master device 11 and this is transmitted to the slave devices 12, 13 etc. In the slave devices 12, 13 etc., search of the designated goal is made in response to address information which can be read in respective moving modes along an optimum moving program (e.g., 3 seconds of FF (10-fold speed), one second of FF1 (5-fold speed), 0.5 second of double speed, 0.3 second of normal speed and then stop) from relation between the goal and current position. Address information which can be read in respective operation modes are, for example, as follows:

| Mode | Address which can be read |
| --- | --- |
| FF | tape counter, tape counter pulse (using relation between two reel spees) |
| FF1 | sector address, frame address |
| double speed | sector address, frame address, time code |
| normal speed | sector address, frame address, data address, time code |
| stop | none |

In this embodiment, the stop position is the designated goal with a preroll section (period of time during which the device shifts to normal speed from stop and each device can enter synchronized running) taken into consideration. When the stop position is given in sector address, it should be within 32 sectors=256 ms to the designated address and, if possible, one sector=8 ms from the data address. When the reproduced position information is given in time code, it should be within several frames, preferably one frame, of time code to the designated address.

Upon confirming that the respective devices have stopped at the designated positions, the CPU 20 of the master device 11 supplies a normal speed running command to the digital recorders 24 of the respective devices to cause the respective devices to enter the normal speed running.

After entering the normal speed running, the CPU 20 of each of the slave devices 12, 13 etc. detects difference between the data address supplied from the master device 11 and its own data address from the output of the subtractor 34 and controls its playback speed by changing the frequency of the internal sampling signal, i.e., performing change of pitch, so that the g difference becomes 0 or a predetermined value close to 0 and thus synchronizing its data address to the data address of the master device 11. If, for example, there is difference of 1 ms (=48 samples ), change of pitch of $$48 \text{ samples}/48 \text{ kHz} = +\frac{1}{1000}$$

is made about 1 second and difference in the data address can thereby be reduced to 0 or the predetermined value close to 0 (there may be a case where repeated operation is necessary). In this state, the sampling data is synchronized at a bit unit in accuracy by performing a PLL control by the hardware circuit.

It is also possible to apply muting to an output signal during an initial synchronized sequence and, after synchronization has been achieved to some extent (e.g., after synchronizing within a range in which synchronization can be made by changing the pitch), cease muting. If synchronization fails during running of the tape, synchronization is brought about again by changing the pitch. In this case, the output signal may be provided directly without applying muting thereto by performing a data interpolation by holding a preceding value until synchronization is completed.

In the above described embodiment, recording and reproduction are made in digital tape recorders. The invention is applicable also to various other recording and reproducing devices using magnetic and optical record media and disk-like record media.

What is claimed is:

1. A method for synchronizing a recording and reproducing system including a master device and a slave device in which a reference clock frequency of at least the slave device can be changed and a playback speed of the slave device can be controlled in accordance with the reference clock frequency, the master and slave devices each having a reference clock and an internal counter, said method comprising the steps of:

recording position information, which synchronized with the reference clock of the master device and has a larger period of change than the reference clock, in both the master and slave devices; and recording, simultaneously with the position information recording step, information to be recorded in the master and slave devices;

reproducing the position information from the master device in accordance with the master device reference clock and from the slave device in accordance with the slave device reference clock;

counting up the internal counters in the master and slave devices in accordance with the master and slave reference clocks, respectively;

resetting the master and slave internal counters in accordance with the position information reproduced in the respective master and slave devices;

comparing a reproduced value of the position information and a count value of the internal counter in the master device with a reproduced value of the position information and a count value of the internal counter of the slave device; and changing a frequency of the reference clock of the slave device so that a difference between the compared values become predetermined values, whereby a recording and reproducing position of the slave device is synchronized with a recording and reproducing position of the master device.

2. A method for synchronizing a recording and reproducing system in accordance with claim 1 wherein said master and slave devices are digital audio tape recorders and said position information is sector address information recorded on a control track of a tape.

* * * * *